// US Patent 4,867,483 — Witt et al. — Sep. 19, 1989

United States Patent [19]
Witt et al.

[11] Patent Number: 4,867,483
[45] Date of Patent: Sep. 19, 1989

[54] PIPE CONNECTOR DEVICE

[75] Inventors: Robert L. Witt, Conroe; Stephen P. Barrett, Stephenville; Tep Ungchusri, The Woodlands; Roy C. Bates, Crosby, all of Tex.

[73] Assignee: FMC Corporation, Chicago, Ill.

[21] Appl. No.: 183,220

[22] Filed: Apr. 19, 1988

[51] Int. Cl.[4] .............................................. F16L 19/00
[52] U.S. Cl. .................................... 285/23; 285/353; 285/354; 285/917
[58] Field of Search ............... 285/353, 354, 384, 355, 285/356, 276, 277, 278, 280, 281, 347, 373, 23; 277/236, 167.5, 207 R

[56] References Cited

U.S. PATENT DOCUMENTS

| | | | |
|---|---|---|---|
| 1,175,834 | 3/1916 | Stephens | 285/354 |
| 1,485,252 | 2/1924 | Denis | 285/354 |
| 2,063,616 | 12/1936 | Meyer | 285/354 |
| 2,273,395 | 2/1942 | Couty | 285/354 |
| 2,310,250 | 2/1943 | Melsom | 285/276 |
| 3,679,237 | 7/1972 | DeAngelis | 285/353 |
| 4,165,943 | 8/1979 | Beach et al. | 403/285 |
| 4,269,436 | 5/1981 | Medney | 285/276 |
| 4,549,756 | 10/1985 | Basile | 285/354 |
| 4,550,936 | 11/1985 | Haeber et al. | 285/347 |

FOREIGN PATENT DOCUMENTS

| | | | |
|---|---|---|---|
| 562245 | 10/1932 | Fed. Rep. of Germany | 285/353 |
| 258255 | 4/1964 | Netherlands | 285/354 |
| 588902 | 6/1947 | United Kingdom | 285/384 |

Primary Examiner—Randolph A. Reese
Assistant Examiner—Anthony Knight
Attorney, Agent, or Firm—Lloyd B. Guernsey; R. C. Kamp; R. B. Megley

[57] ABSTRACT

A pipe connector device for interconnecting first and second pipe elements using a retention member removably secured to the first pipe element by load elements. The retention member is secured to the second pipe element by pipe threads or a second retention member can be secured to the second pipe element by load elements and the first and second retention members threaded together. A seal is extended along a portion of the length of the first and second pipe elements adjacent to an end portion of each of the pipe elements to prevent leakage. This provides a fluid-tight seal which is relatively independent of any pressure exerted between the first and second pipe elements by the retention member.

14 Claims, 8 Drawing Sheets

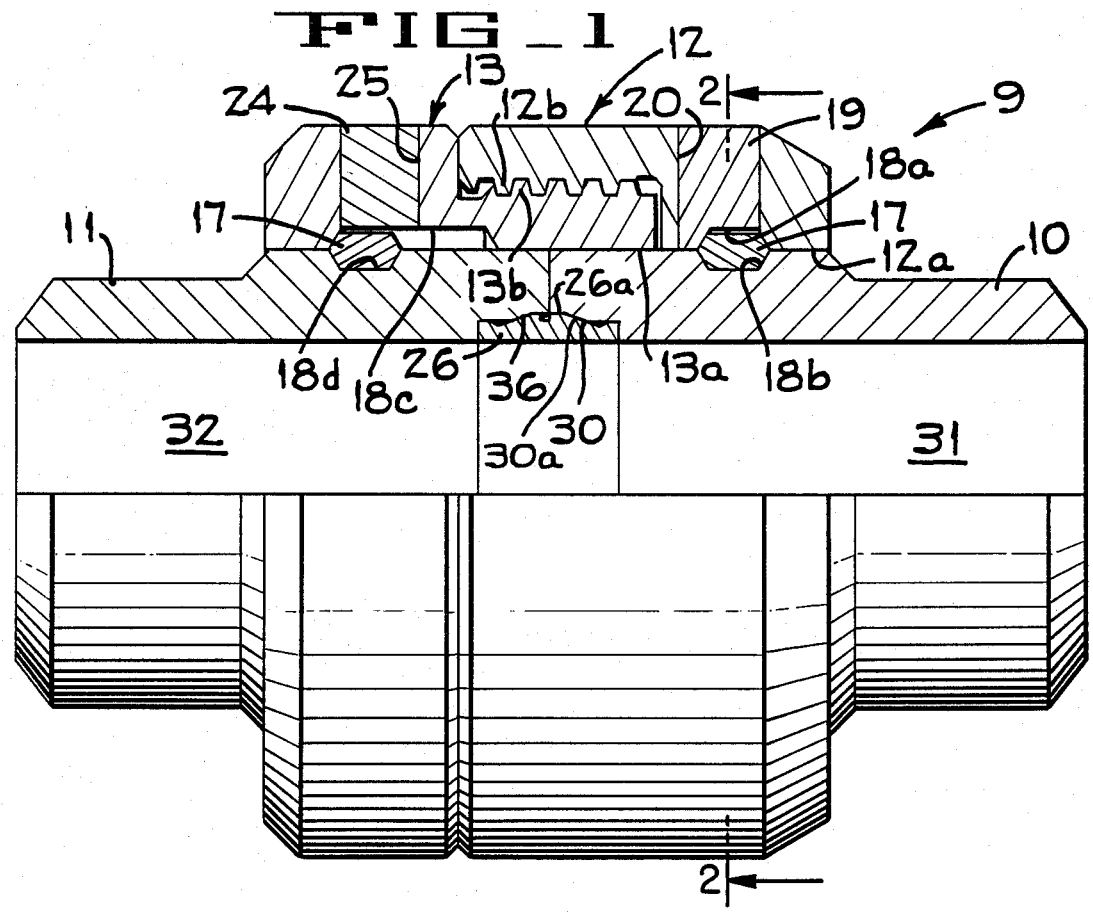
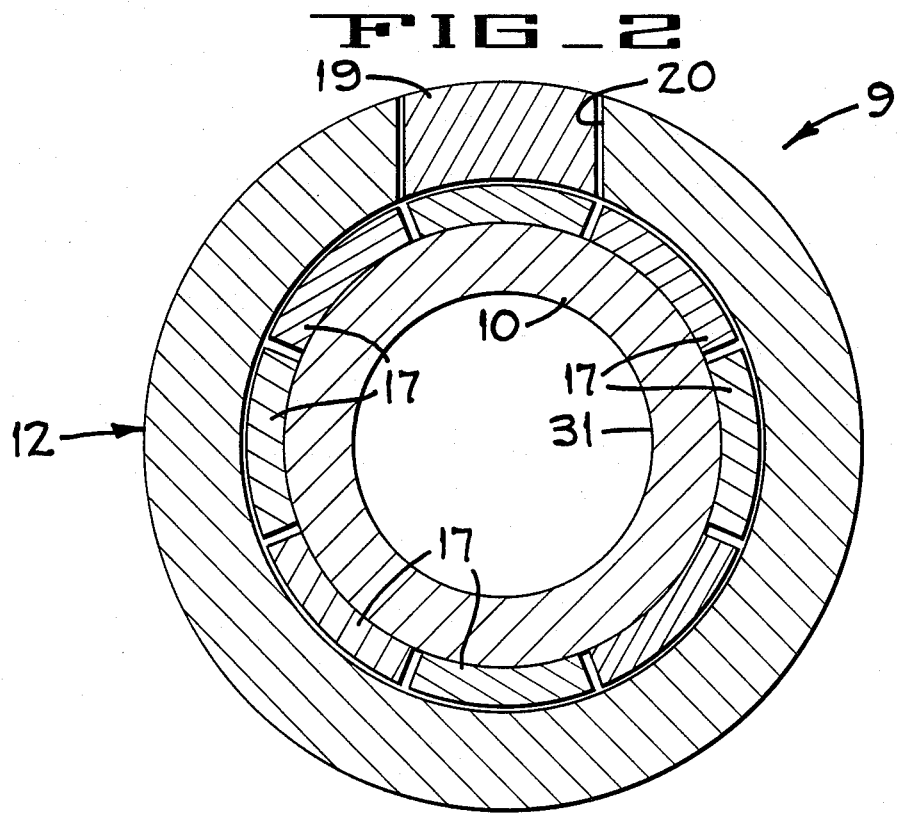

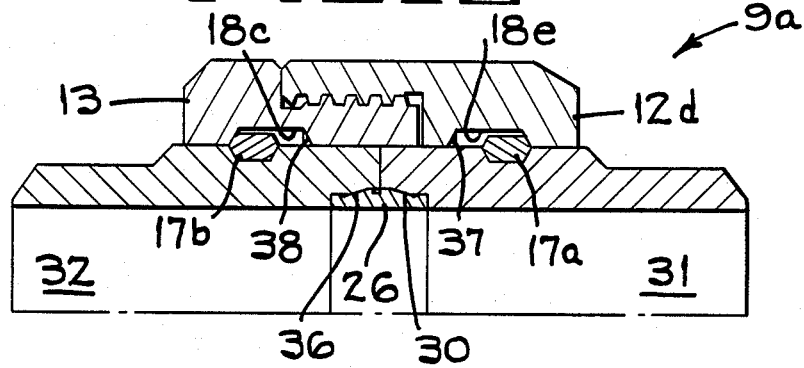
FIG_3
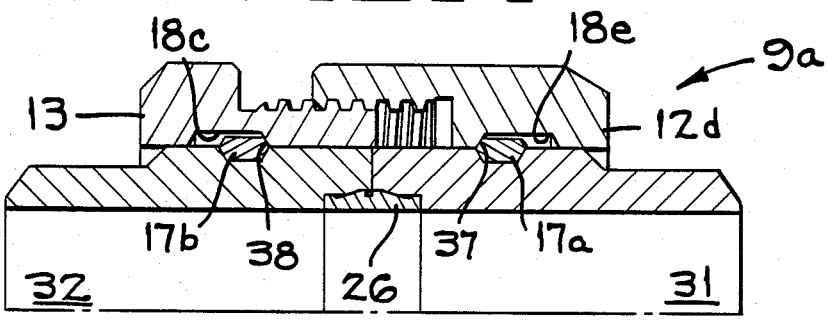
FIG_4
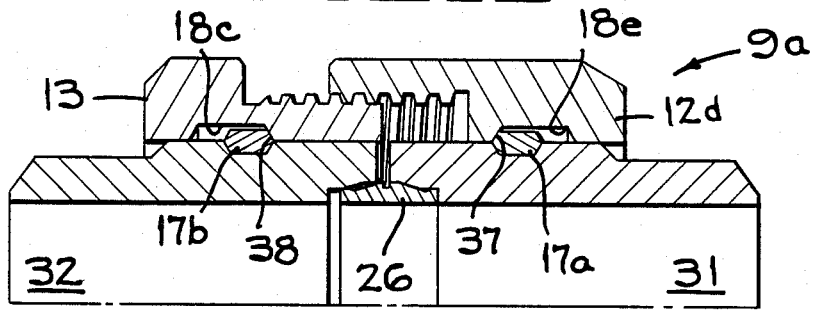
FIG_5
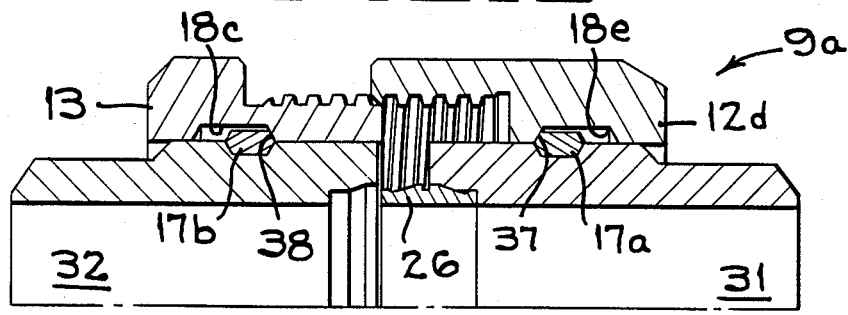
FIG_6

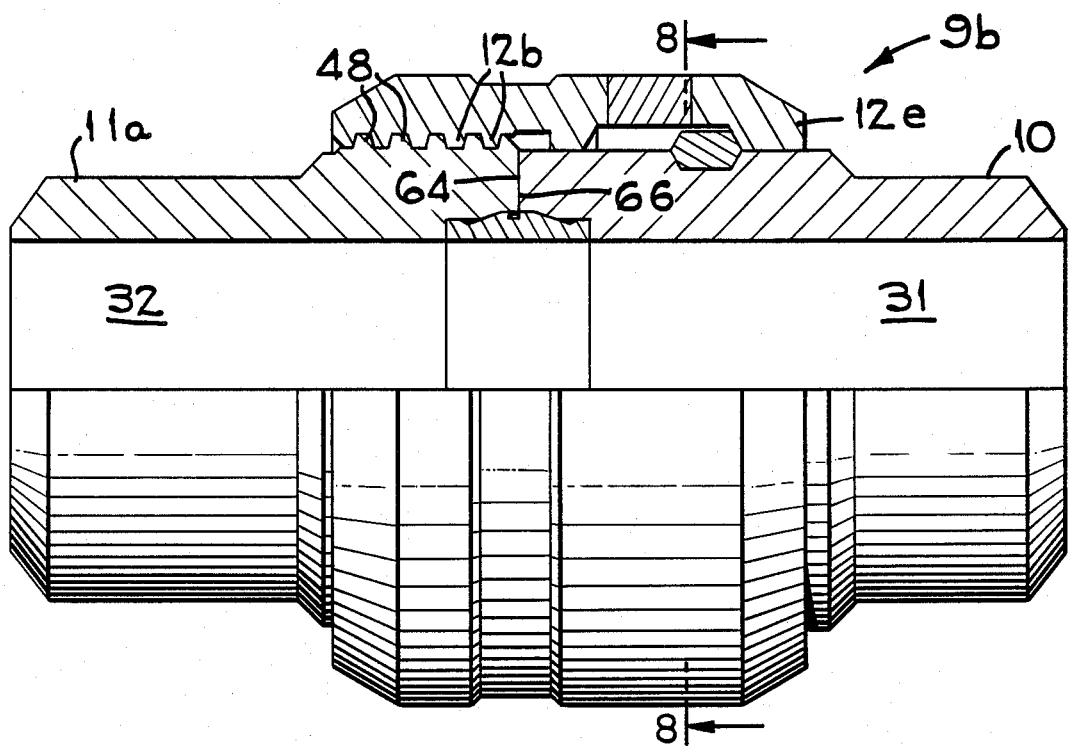
FIG_7
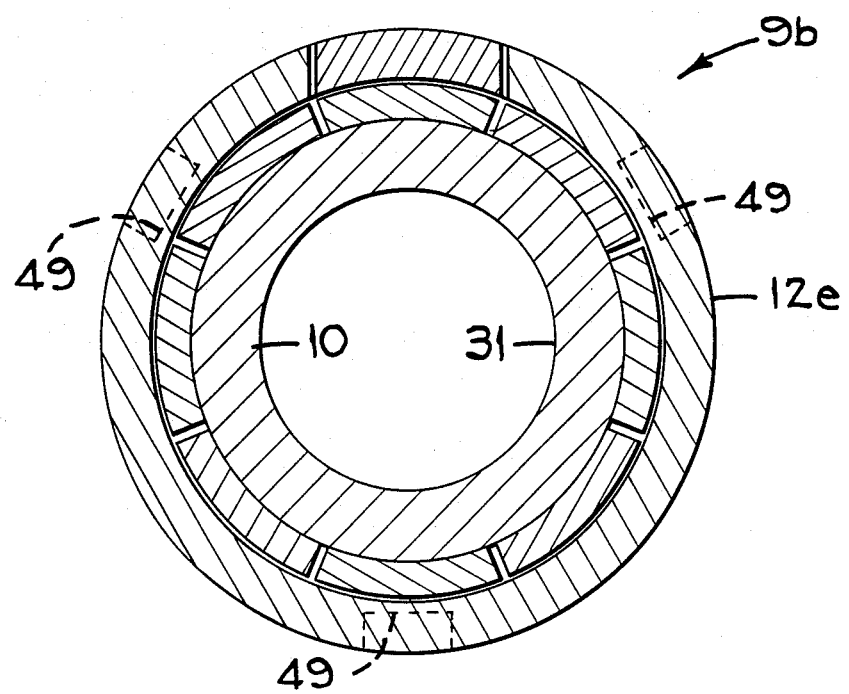
FIG_8

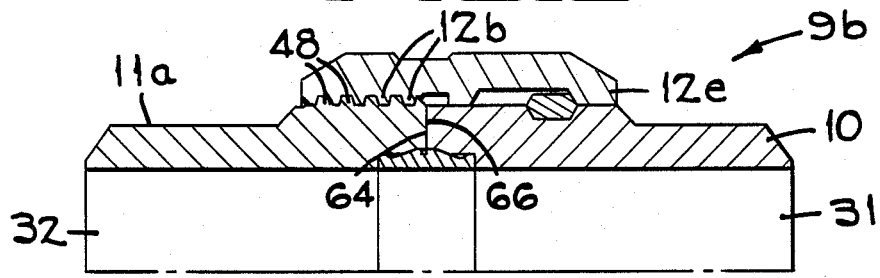
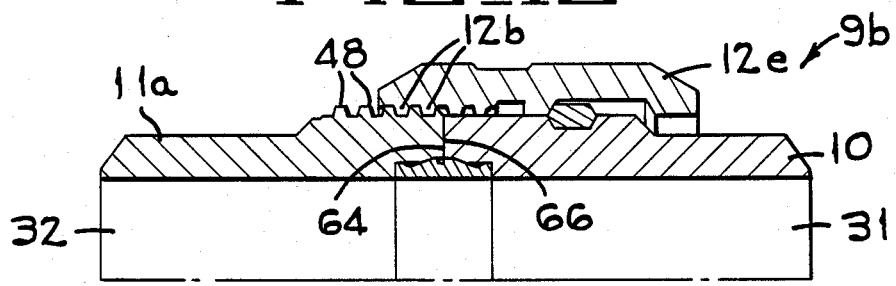
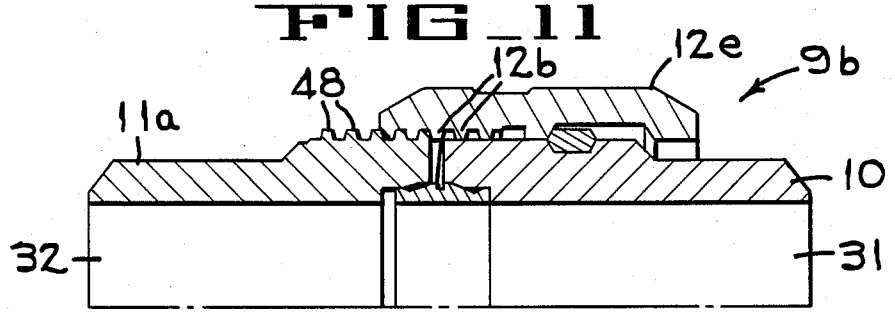
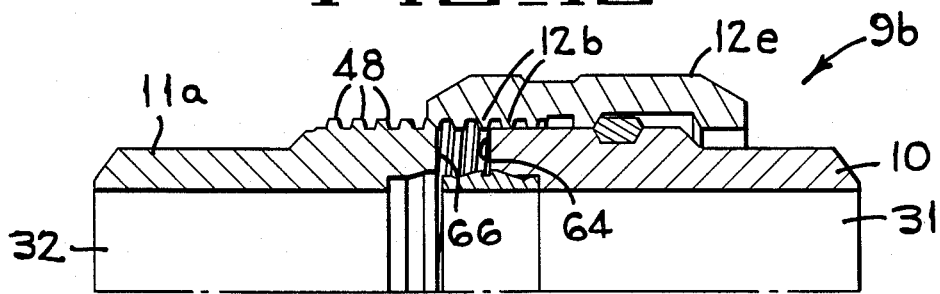

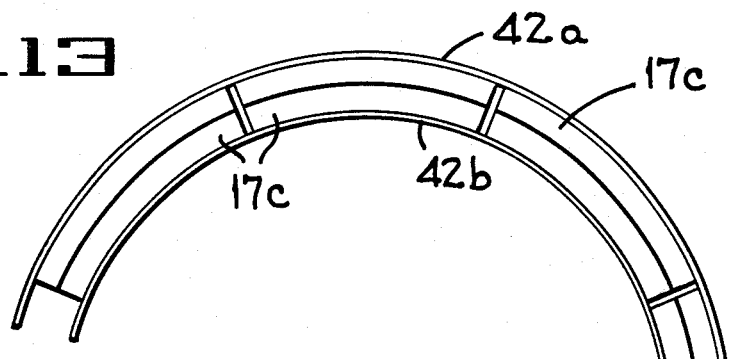
FIG_13
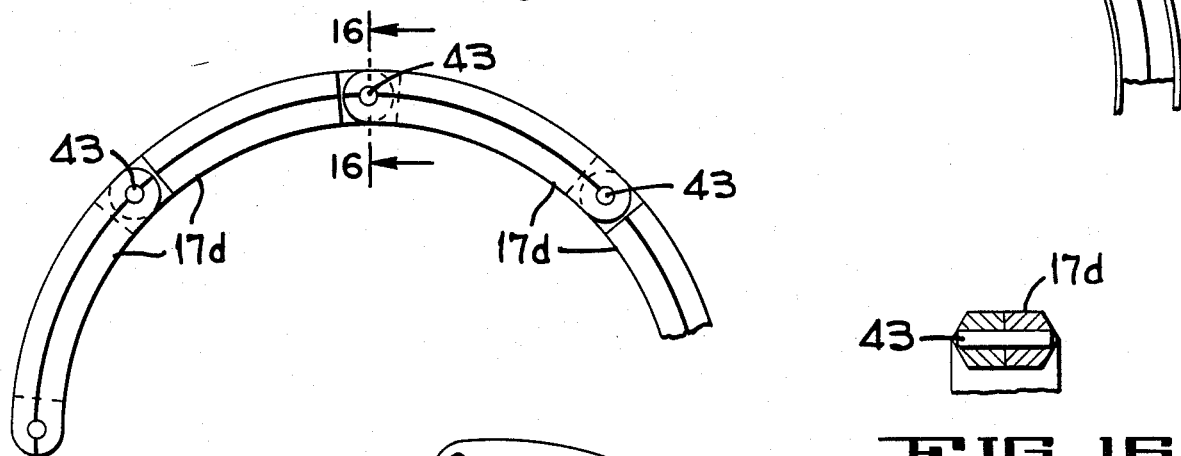
FIG_14
FIG_16
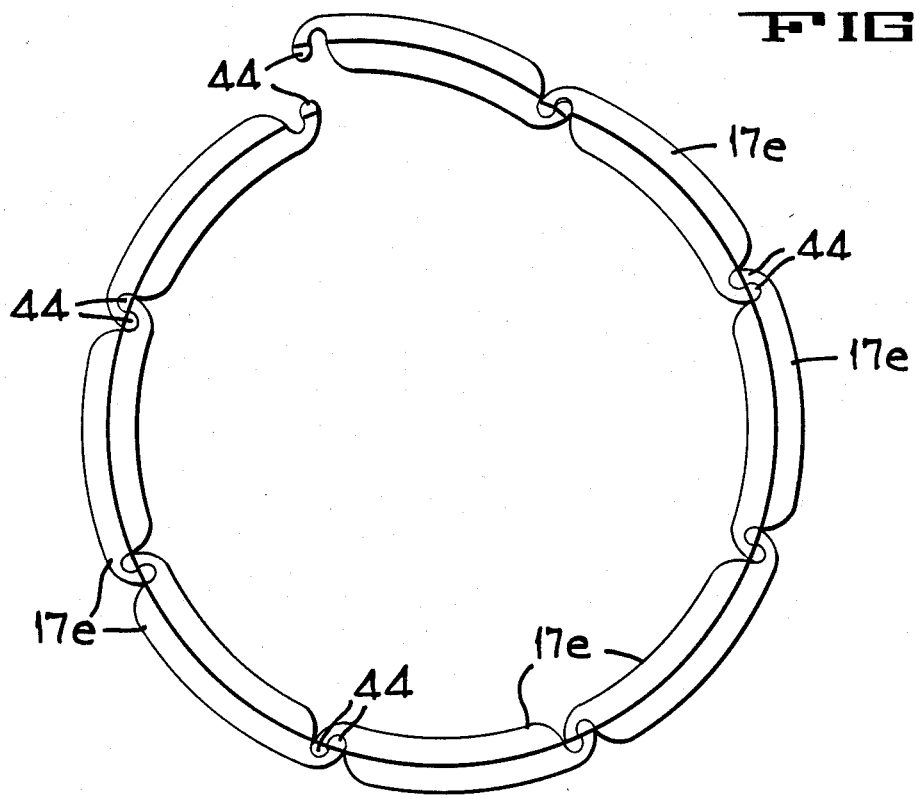
FIG_15

FIG_17
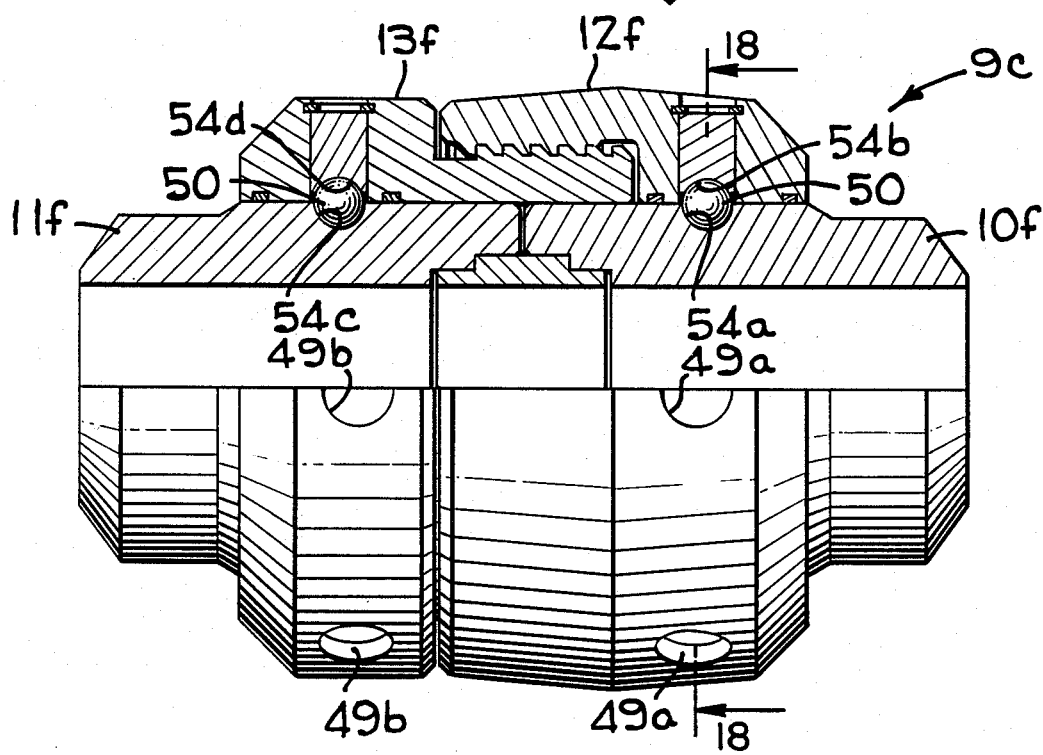
FIG_18
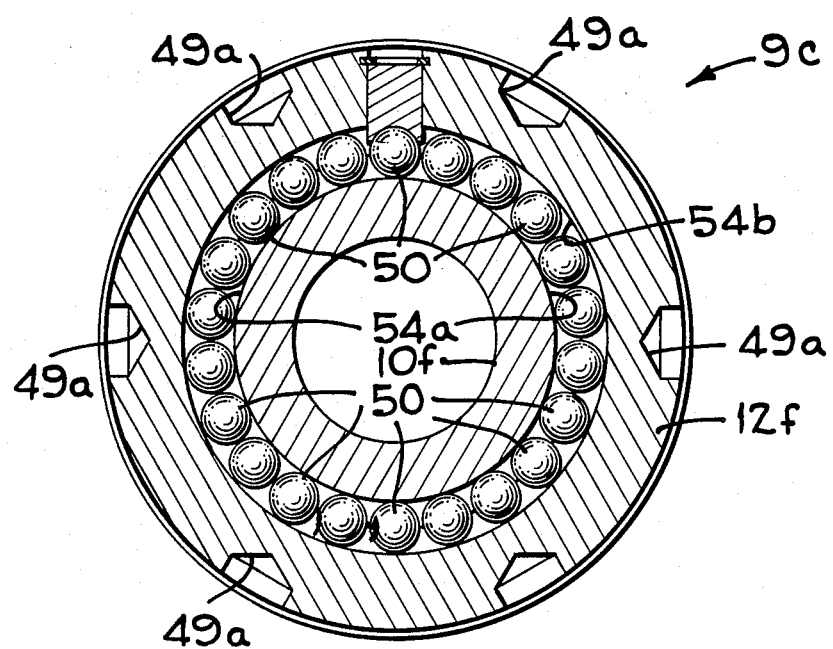

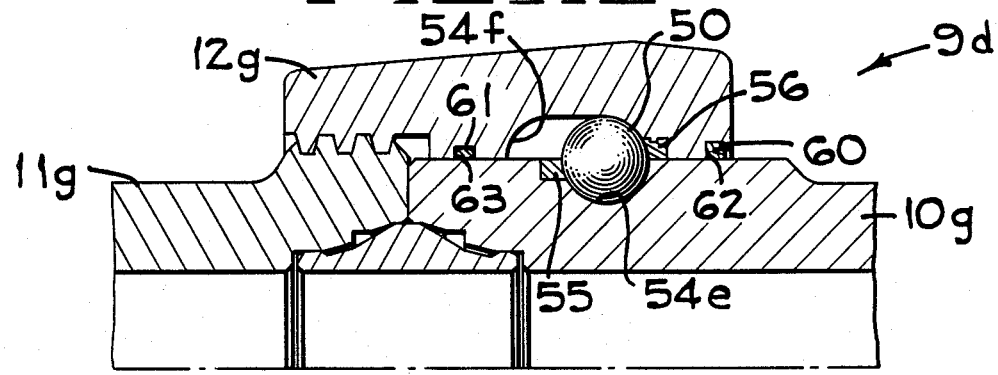
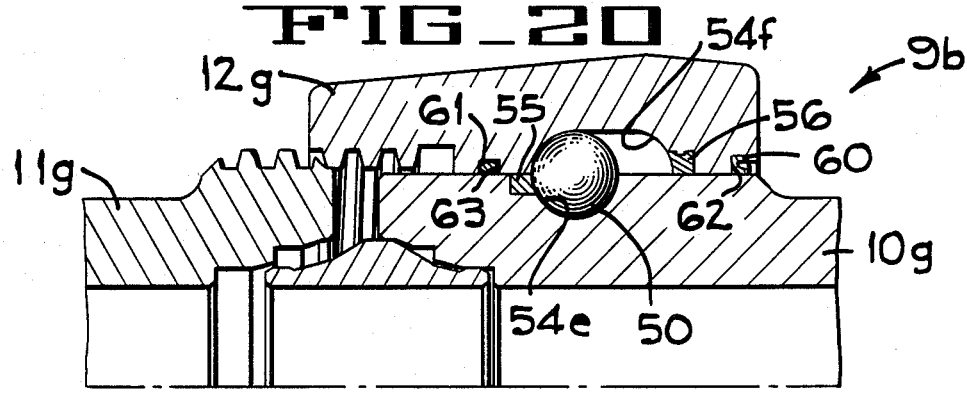
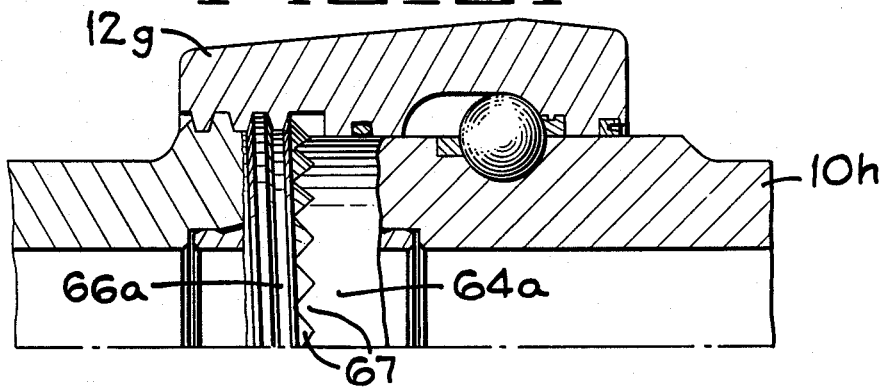
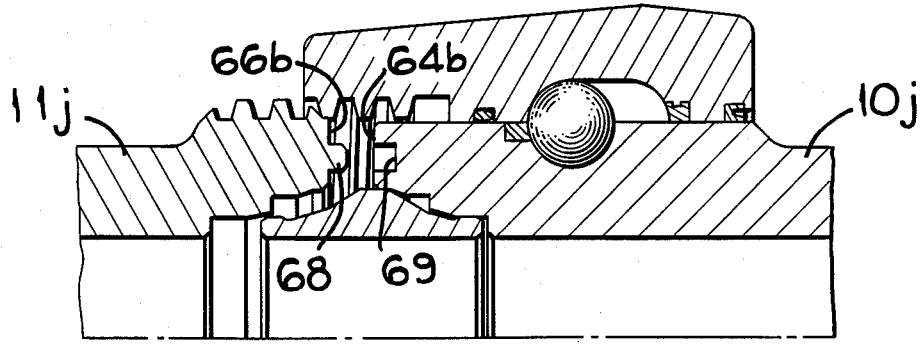

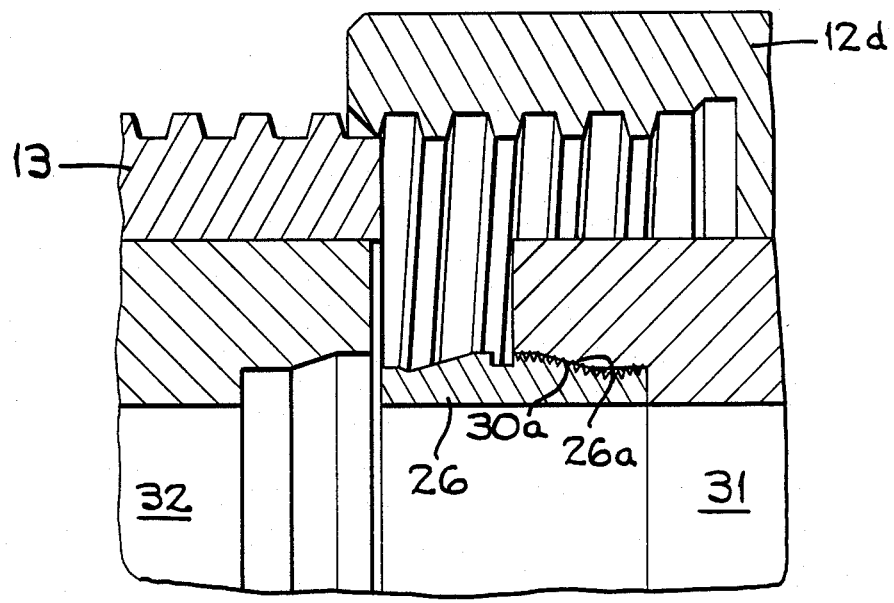
FIG_23

PIPE CONNECTOR DEVICE

BACKGROUND OF THE INVENTION

This invention relates to pipe connector devices, and more particularly, to such connector devices for use in temporary and quasi-permanent pipe flowlines.

Temporary and permanent flowlines are commonly used in production, drilling, cementing, stimulation, injection and testing of oil and gas wells. Flexible devices with quick connections at the ends provide a quick and convenient layout of the piping system and provide fluid tight seals between the mating pipe element members. Some of the flexible devices used are swivel joints, hoses, composite structure pipe, and ball joints. Seals and separate connections are required at each end of the device. Connections include hammer type unions, flanges, clamps, specialty couplings, and pipe threads.

SUMMARY OF THE INVENTION

The present invention discloses a pipe connector device that can selectively serve as a swivel joint and as a pipe connector. This reduces the number of seal leak paths in the total piping system; reduces the number of variations in pipe elements required; enhances the utility of individual pipe elements; and reduces the cost of pipe elements required. A pair of pipe retention members each have an internal bore for receiving one of a pair of pipe elements. Each of the retention members is secured to a corresponding one of the pipe elements by a load element, such as a load ring. The retention members are interconnected by pipe threads or other means to secure the pipe elements in a fixed end-to-end relationship. The retention members can be interconnected with the pipe elements positioned a distance apart and the retention members rotated relative to each other to pull the pipe elements into tight alignment. The retention members can be readily disconnected from the pipe elements by merely removing the load elements and the retention members removed from the pipe elements. A seal is connected at the junction of the pipe elements to prevent leakage at the junction. When a pair of threaded nuts are used as the retention members the joined pipe elements can be identical thereby reducing the number of different elements to be manufactured. The profile of the pipe elements of the present invention is small compared to unions and similar devices in prior art connectors.

BRIEF DESCRIPTION OF THE DRAWINGS

FIG. 1 is a side elevation, partly in section, of one embodiment of a pipe connector of the present invention.

FIG. 2 is an end section of the pipe connector of FIG. 1 taken along line 2—2 of FIG. 1.

FIGS. 3-6 are partial sections of another embodiment of the pipe connector of FIG. 1 showing a sequence of disconnecting the pipe elements.

FIG. 7 is a side elevation, partly in section, of another embodiment of a pipe connector of the present invention.

FIG. 8 is a sectional view of the pipe connector of FIG. 7 taken along line 8—8.

FIGS. 9-12 are partial sections of the pipe connector of FIG. 7 showing a sequence of disconnecting the pipe elements.

FIGS. 13-15 disclose a variety of load rings which can be used to join the retention members of FIGS. 1-12 to the pipe elements disclosed in FIGS. 1-12.

FIG. 16 is a cross sectional view taken along line 16—16 of FIG. 14.

FIG. 17 is a side elevation, partly in section, of another embodiment of the present invention.

FIG. 18 is a sectional view of the pipe connector of FIG. 17 taken along line 18—18.

FIGS. 19 and 20 are side elevations, in partial section, showing operation of another embodiment of the present invention.

FIG. 21 is a side elevation in partial section, of the embodiment of FIG. 19 showing details of the end portions of the pipe elements.

FIG. 22 is a sectional side elevation of the embodiment of FIG. 19 showing other details of the end portions of the pipe elements.

FIG. 23 is a side elevation of the seal showing the knurled portion.

DESCRIPTION OF THE PREFERRED EMBODIMENT

FIGS. 1, 2 disclose a pipe connector device 9 having a pair of pipe elements 10, 11 interconnected by a pair of retention members 12, 13 and a pair of 20 load elements 17. Pipe elements 10, 11 are mounted in an internal bore 12a, 13a of the retention members 12, 13 and secured to members 12, 13 by load elements 17, each mounted in a pair of grooves 18a, 18b and 18c, 18d.

To assemble connector device 9, member 12 is positioned about pipe element 10 with groove 18a adjacent to groove 18b and member 13 is positioned about pipe element 11 with groove 18c adjacent to groove 18d. A plug 19 is removed from a bore 20 of member 12 and a plurality of load elements 17 are fed through bore 20 into grooves 18a, 18b to secure member 12 to pipe element 10 and plug 19 is replaced in bore 20. A plug 24 is removed from a bore 25 and a plurality of load elements 17 are fed through bore 25 into grooves 18c, 18d to secure member 13 to pipe element 11. Plug 24 is replaced in bore 25 to keep load elements 17 in place. A sealing member 26 is placed in a portion of a cavity 30 adjacent to a center bore 31 of pipe element 10. Pipe elements 10 11 are positioned with center bore 31 of pipe element 10 aligned with a center bore 32 of pipe element 11. Member 12 is rotated relative to member 13 so that a threaded portion 12b of member 12 mates with a threaded portion 13b of member 13 and draws pipe elements 10, 11 toward the position shown in FIG. 1. A portion of sealing member 26 moves into a cavity 36 adjacent to center bore 32 to provide a fluid tight seal between elements 10 and 11. Groove 18c is wider than groove 18d so that retention members 12, 13 can be partially threaded together before a rotation of member 12 relative to member 13 applies pressure to secure pipe elements 10, 11 in tight abutment.

When a portion 26a (FIGS. 1, 23) of seal 26 is knurled and placed into cavity 30 in the end portion of pipe element 10 the knurled portion presses against a surface 30a adjacent to cavity 30 causing seal 26 to remain attached to pipe element 10 when the elements 10, 11 are later separated. This feature plus the locking of load elements 17 into grooves 18a-18d prevents any loose piece of the connector device from being dropped or lost when the members 12,13 are separated, such as during replacement of sealing member 26.

Another embodiment of the present invention 9a disclosed in FIGS. 3-6 includes another wide groove 18e in retention member 12d. Plugs 19, 24, disclosed in FIGS. 1, 2, have been omitted from FIGS. 3-6 in order to simplify the drawings but it should be understood that such plugs are needed to install the load elements 17a, 17b.

When it is desired to disconnect pipe element 10 from pipe element 11, to replace seal 26 or for other reasons, member 12d is rotated relative to member 13 causing the members 12d, 13 to be spaced as shown in FIG. 4. Further rotation of member 12d relative to member 13 causes a shoulder 37 of groove 18e to press against a load element 17a and a shoulder 38 of groove 18c to press against a load element 17b to move pipe element 10 away from pipe element 11 as shown in FIG. 5. The slight separation of elements 10, 11 allows any internal pressure in bores 31, 32 to bleed off while threads 12b, 13b are still engaged and prevent elements 10, 11 from being blown apart. Still further rotation of retention member 12d allows pipe elements 10, 11 to be separated as shown in FIG. 6.

The forced separation of pipe elements 10, 11 due to rotation of members 12,13 presents elements 10, 11 from sticking together and facilitates seal replacement or dismantling of flowline systems.

In the embodiments disclosed in FIGS. 1-6 pipe elements 10, 11 are identical which simplifies manufacturing and reduces costs over connectors using unlike pipe elements. The load elements 17, 17a, 17b can also be identical to reduce costs.

Load elements 17c, 17d, 17e which can be used in the present invention are disclosed in FIGS. 13-16. Load elements 17c (FIG. 13) are elongated elements joined by a pair of tape elements 42a, 42b. The cross sectional view of element 17c is the same as element 17 of FIG. 1. The joined elements 17c-17e can be fed into grooves 18a-18d (FIG. 1) through bores 20, 25 to secure pipe elements 10, 11 to retention members 12, 13. Elements 17c-17e can be retrieved when desired by using a hook (not shown) to grab the load element nearest the bore and pull the joined elements 17c-17e out through the bore 20, 25. Load elements 17d (FIGS. 14, 16) are joined in a chain fashion by a plurality of pins 43. Load elements 17e each includes a hook portion 44 on each end shaped to mate with a similar hook portion 44 of an adjacent load element. The elements 17e can be joined together to form a chain which can be fed into grooves 18a-18d (FIG. 1) to secure pipe elements 10, 11 to retention members 12, 13.

A pipe connector device 9b disclosed in FIGS. 7-12 includes pipe element 10 as previously shown, but includes a plurality of threads 48 on the end portion of pipe element 11a. . Threads 48 mate with threads 12b of a retention member 12e and eliminate the need for retention member 13 of FIGS. 1-6. A plurality of shallow holes 49 are formed in retention member 12e (FIG. 8) to provide a grip for a tool (not shown) for rotating member 12e relative to pipe element 11a to connect or disconnect element 11a and member 12e. The disconnect sequence is shown in FIGS. 9-12 and is similar to the sequence shown in FIGS. 3-6.

The various embodiments of the present invention disclosed in FIGS. 1-12 can be connected in a variety of arrangements. Retention members 12, 13 (FIG. 1) can easily be disconnected from pipe elements 10, 11 by removing load elements 17 through bores 20, 25. The internal bores 12a, 13a of members 12, 13 are large enough so that members 12, 13 can easily be shipped off of pipe elements 10, 11. The various embodiments disclosed in FIGS. 1-12 can be interconnected in several different arrangements. For example, retention members 12, 13 can be disconnected and member 12 removed from pipe element 10. A retention member 12e (FIG. 7) can be connected to pipe element 10 and used to connect pipe element 10 to pipe element 11a. When pipe elements 10, 11 are slightly separated as shown in FIG. 5, element 10 can be swiveled relative to element 11 if desired.

A pipe connector device 9c disclosed in FIGS. 17, 18 differs from device 9a (FIGS. 1, 2) by using a plurality of ball bearings 50 in a plurality of raceways 54a-54d for securing retention members 12f, 13f to pipe elements 10f, 11f respectively. A plurality of shallow holes 49a, 49b in retention members 12f, 13f facilitate gripping these members for relative rotation to connect or disconnect pipe elements 10f, 11f.

A pipe connector device 9d disclosed in FIGS. 19, 20 differs from device 9b (FIGS. 7, 8) in that a plurality of ball bearings 50 in a pair of raceways 54e, 54f secure retention member 12g to pipe element 10g. A split bearing ring 55 in raceway 54e and another split bearing ring 56 in raceway 54f provide replaceable shoulders which ball bearings 50 press against to secure pipe element 10g against pipe element 11g. Raceway 54f is significantly wider than ball bearings 50 to allow retention member 12g to rotate relative to pipe element 11g without forcing elements 10g, 11g apart until member 12g is partially unthreaded from element 11g. A pair of sealing members 60, 61 in a pair of grooves 62, 63 seal ball bearings 50 prevent leakage of contaminants into raceways 54e, 54f and prevent outward leakage of any lubricant in raceways 54e, 54f.

When it is desired that to prevent the rotation of pipe element 10 relative to pipe element 11a (FIG. 7) or prevent rotation of pipe element 10g relative to pipe element 11g (FIGS. 19-22), a pair of pipe ends 64a, 66a include a plurality of matching serrations 67 (FIG. 21). When pipe elements 10g, 11g are slightly separated element 10g can be rotated relative to element 11g is desired. When retention member 12g causes ends 64a, 66a to be pressed together, serrations 67 prevent pipe elements 10g, 11g from rotation relative to each other.

A tongue 68 and groove 69 arrangement (FIG. 22) in ends 64b, 66b can also be used to prevent rotation of pipe element 10j relative to pipe element 11j. When pipe ends 64, 66 are smooth (FIG. 7) a rotation of pipe element 11a relative to pipe element 10 could result in rotation of pipe element 11a relative to retention member 12e, and cause leakage in the pipe connector device 9b.

The present invention uses few parts to provide a connector device for swivel joints and for a pipe connector. Identical pipe elements can be used for both of the connecting pipes to reduce the number of types of elements required. All elements are secured to the pipe elements to prevent loose pieces from being dropped or lost.

Although the best mode contemplated for carrying out the present invention has been herein shown and described, it will be apparent that modification and variation may be made without departing from what is regarded to be the subject matter of the invention.

What is claimed is:

1. A pipe connector device for securing a pair of pipe elements in a fixed end-to-end relationship, said device comprising:

first and second pipe elements each having a center bore extending lengthwise through said pipe element, said first pipe element having a groove extending about the outer circumference of said first pipe element, a first cavity adjacent to said center bore in an end portion of said first pipe element, a second cavity adjacent to said center bore in an end portion of said second pipe element;

a first retention member having an internal bore for receiving said first pipe element, said first retention member having a groove adjacent to said internal bore;

a plurality of load elements mounted in said first pipe element groove and in said first retention member groove to secure said first retention member to said first pipe element with said first retention member rotatable about said first pipe element;

means for selectively connecting said first retention member to said second pipe element; and sealing means extending along a portion of the length of said first and said second pipe elements and extending across a junction between said pipe elements for providing a fluid-tight seal which is relatively independent of any pressure exerted between said first and said second pipe elements by said connecting means, said sealing means including a knurled portion to retain said sealing means in said first cavity when said first and said second pipe elements are separated, and said sealing means fitted into said first and said second cavities to provide a sealing action when said first pipe element is adjacent to said second pipe element.

2. A pipe connector device as defined in claim 1 including a threaded outer portion on said second pipe element, said first retention member having a threaded portion which mates with said threaded portion of said second pipe element to selectively connect said second pipe element to said first retention member.

3. A pipe connector device as defined in claim 1 including a second retention member having an internal bore for receiving said second pipe element, said second retention member having a groove adjacent to said internal bore, said second retention member having a threaded portion, said first retention member having a threaded portion which mates with said threaded portion of said second retention member to selectively connect said first and said second retention members, said second pipe element having a groove extending about the outer circumference of said second pipe element, and means for moving a plurality of load elements into said second retention member groove and said second pipe element groove to connect said second retention member to said second pipe element.

4. A pipe connector device as defined in claim 1 wherein said load elements comprise a plurality of ball bearings mounted in said grooves.

5. A pipe connector device as defined in claim 1 wherein said load elements are interconnected in an end-to-end manner, and wherein said first retention member includes a plugable bore between said groove in said first retention member and an outer circumference of said first retention member to facilitate moving said load elements into said first pipe element groove and said first retention member groove to interconnect said first pipe element and said first retention member.

6. A pipe connector device as defined in claim 5 wherein said load elements are discrete segments of a cylinder linked together with adhesive tape.

7. A pipe connector device as defined in claim 5 wherein said load elements are discrete segments of a cylinder linked together in a chain fashion by a plurality of pins.

8. A pipe connector device as defined in claim 5 wherein said load elements each includes a tongue on one end and a groove on the other end to enable said load elements to link together with a snap-in tongue and groove arrangement.

9. A pipe connector device as defined in claim 5 wherein said load elements comprise a plurality of ball bearings mounted in said grooves, and wherein at least one of said grooves is appreciably wider than the width of said ball bearings to enable said first retention member to be partially unthreaded from said second pipe element while said first pipe element is abutted against said second pipe element.

10. A pipe connector device comprising:

first and second pipe elements each having a center bore extending lengthwise through said pipe elements, a first cavity adjacent to said center bore in an end portion of said first pipe element, a second cavity adjacent to said center bore in an end portion of said second pipe element;

first and second retention members each having an internal bore for receiving one of said pipe elements;

means for securing each of said pipe elements in said internal bore of a corresponding one of said retention members;

means for interconnecting said first and said second retention members to secure said first and said second pipe elements in a fixed end-to-end relationship; and sealing means extending along a portion of the length of said first and said second pipe elements adjacent to an end portion of each of said first and said second pipe elements to prevent leakage at a joint between said pipe elements with a sealing action being relatively independent of any pressure exerted between said first and said second pipe elements by said interconnecting means, said sealing means including a kurled portion to retain said sealing means in said first cavity when said first and said second pipe elements are separated, and said sealing means fitting into said first and said second cavities to provide a sealing action when said first pipe element is adjacent to said second pipe element.

11. A pipe connector device as defined in claim 10 wherein said first pipe element is identical to said second pipe element.

12. A pipe connector device as defined in claim 10 wherein said means for securing includes a groove adjacent to said bore in each of said retention members, a corresponding groove on an outside portion of each of said pipe elements and a plurality of load members mounted in said retention member groove and in said pipe element groove to secure one of said retention members to a corresponding one of said pipe elements.

13. A pipe connector device as defined in claim 12 wherein said groove in said second retention member is appreciably wider than the width of said load members to enable said first and said second retention members to be partially disconnected while said first pipe element is abutted against said second pipe element.

14. A pipe connector device as defined in claim 10 wherein said means for interconnecting said first and second retention members includes a threaded portion on said first retention member and a mated threaded portion on said second retention member, and wherein a partial unthreading of said first and second retention members forces said first and said second pipe elements to move apart.

* * * * *